(12) United States Patent
Farell

(10) Patent No.: US 9,605,984 B2
(45) Date of Patent: Mar. 28, 2017

(54) ELECTRONIC DISPLAY ASSEMBLY

(71) Applicant: James Paul Farell, Canton, MI (US)

(72) Inventor: James Paul Farell, Canton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 44 days.

(21) Appl. No.: 14/604,226

(22) Filed: Jan. 23, 2015

(65) Prior Publication Data
US 2016/0225310 A1   Aug. 4, 2016

(51) Int. Cl.
*G01D 13/28*   (2006.01)
*G09G 3/36*   (2006.01)
*G09G 3/30*   (2006.01)

(52) U.S. Cl.
CPC .............. *G01D 13/28* (2013.01); *G09G 3/30* (2013.01); *G09G 3/3611* (2013.01); *G09G 2300/023* (2013.01)

(58) Field of Classification Search
CPC .............. G09G 3/3208; G09G 3/3611; G09G 2300/023; G09G 2360/04; G09G 2330/027; G09G 2320/062; G06T 1/20; G01D 13/28
USPC ................................................ 340/462, 466
See application file for complete search history.

(56) References Cited

U.S. PATENT DOCUMENTS

| | | | | |
|---|---|---|---|---|
| 3,689,835 A | * | 9/1972 | Bickfrod | G01G 19/021 324/114 |
| 5,578,985 A | * | 11/1996 | Cremers | B60K 37/02 340/459 |
| 5,920,256 A | * | 7/1999 | Toffolo | G01D 7/002 340/461 |
| 8,400,288 B2 | * | 3/2013 | Bowden | B60K 35/00 116/288 |
| 2009/0200367 A1 | * | 8/2009 | Arnouse | G06F 15/02 235/375 |
| 2010/0050927 A1 | | 3/2010 | Sultan et al. | |

FOREIGN PATENT DOCUMENTS

EP    2647413 A2    10/2013

* cited by examiner

*Primary Examiner* — Michael Pervan
(74) *Attorney, Agent, or Firm* — Dickinson Wright PLLC

(57) ABSTRACT

A display assembly includes an LCD that is transparent and has a viewing area and a blocked area which are reconfigurable. The display assembly includes a self-emissive display that is also transparent and extends along and in front of the LCD. A graphics processing unit is coupled with and controls the LCD and the self-emissive display. The LCD is controlled to allow light through the viewing area and the blocked area while the self-emissive display is off in a full analog mode. The LCD is controlled to block light through the viewing area and the blocked area while the self-emissive display is controlled to display an image in a full digital mode. Additionally, the LCD is controlled to allow light through the viewing area and block light through the blocked area while the self-emissive display is controlled to display an image in a hybrid mode.

18 Claims, 4 Drawing Sheets

ELECTRONIC DISPLAY ASSEMBLY

BACKGROUND

Conventional instrument clusters used in vehicles today commonly include analog gauges (i.e. a gauge motor moves a pointer or needle) to convey information or a characteristic of the vehicle such as the speed of the vehicle. Instrument clusters may also include electronic or digital displays which can be used to display additional information or characteristics in the form of text or graphics (e.g. warning messages). Because instrument clusters are increasingly display a myriad of information, it may be desirable to employ reconfigurable displays that, for example, are capable of showing navigation information in one instance and showing vehicle diagnostic information in another instance.

While electronic displays are advantageous in instrument clusters, it is still beneficial for a vehicle driver to be able to monitor characteristics of the vehicle in which the instantaneous value and rate of change are both important. These characteristics include, but are not limited to vehicle speed and engine RPM. Although digital displays can recreate what a mechanical gauge looks like, many vehicle buyers still prefer to see mechanical gauges. Therefore, display assemblies used in instrument clusters may include transparent displays or combinations of analog gauges and electronic displays. Other uses of such display assemblies having transparent displays include gaming machines, which also may include features or objects located behind the display.

In one example, the display assembly includes a Liquid Crystal Display (LCD) that is transparent. A self-emissive display that is also transparent is disposed adjacent to the LCD. A graphics processing unit is used to control the LCD and the self-emissive display. Features or objects are disposed behind the LCD and may be selectively viewed or blocked.

SUMMARY

A display assembly and a system for managing the display assembly are provided. The display assembly includes an LCD that is transparent. The display assembly further includes a self-emissive display that is also transparent and is disposed adjacent to the LCD. A graphics processing unit is used to control the LCD and the self-emissive display. The LCD has a viewing area and a blocked area which are reconfigurable. The self-emissive display extends along and in front of the LCD. The graphics processing unit is coupled with the LCD to control the LCD to selectively allow light to pass through the viewing area while selectively blocking light from passing through the blocked area as the display assembly operates. The graphics processing unit is also coupled with the self-emissive display to control the self-emissive display to selectively display an image or video as the display assembly operates.

DESCRIPTION OF THE DRAWINGS

The detailed description refers to the following drawings, in which like numerals refer to like items, and in which.

DETAILED DESCRIPTION

Display assemblies used for vehicles commonly include electronic or digital displays to display information such as warnings or navigation information. Digital displays used in instrument clusters may also be used to mimic a mechanical gauge to display engine speed or vehicle speed. Since many vehicle buyers still prefer to see mechanical gauges, digital displays may be used in conjunction with mechanical gauges. Alternatively, transparent displays may be placed in front of mechanical gauges.

Currently available transparent displays conventionally maintain a transparent state or emit light. As used in an instrument cluster or otherwise, these display assemblies perform a function of selective backlighting. Such display assemblies do not dynamically allow variable portions of the area behind the display to be viewed while others are blocked. Instead, they either backlight and block an entire area or remain transparent over the entire area.

Other currently available display assemblies may include objects or features located in the background behind a display. These display assemblies may have the capability of blocking the features or objects so that only the contents of the display are visible, however the background is flood lit with white light. As a result of using flood lighting, however, it is often difficult to convey craftsmanship in the display assembly. Therefore, there remains a need for a display assembly that can dynamically enable variable portions of the area behind the entire display to be viewed while other portions are blocked without using flood lighting.

Figure 1:
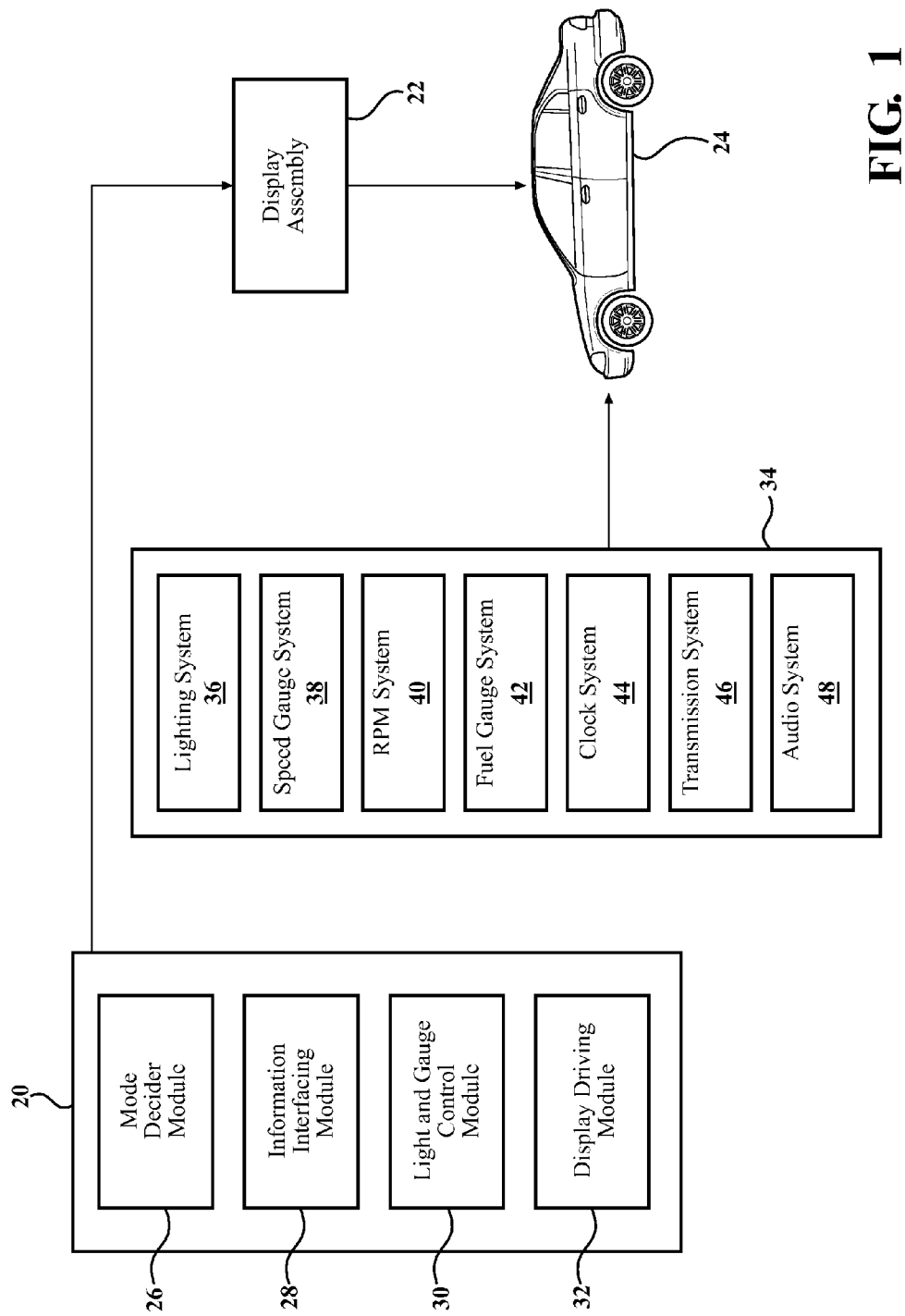
FIG. 1 is a block diagram of a system for managing a display assembly according to one embodiment.

FIG. 1 is a block diagram illustrating an example system 20 for managing a display assembly 22. The system 20 and the display assembly 22 may be implemented in a vehicle 24. The system 20 includes a mode decider module 26, an information interfacing module 28, a light and gauge control module 30 and a display driving module 32.

The vehicle 24 may include a plurality of vehicle systems 34. The plurality of vehicle systems 34 may include systems 20 such as, but not limited to a lighting system 36, a speed gauge system 38, a revolution-per-minute system 40, a fuel gauge system 42, a clock system 44, a transmission system 46, and an audio system 48. It should be appreciated that any sort of system 20 that indicates information or a characteristic associated with vehicle 24 may be included as one of the plurality of vehicle systems 34.

The mode decider module 26 determines a mode of the display assembly 22. As explained further in this disclosure, the display assembly 22 may be either in a full analog mode, a full digital mode, or a hybrid mode. The mode decider module 26 may be configured to decide the mode through various techniques. For example, if the display assembly 22 is to operate in a specific mode, the mode decider module 26 may receive a signal indicating the specific mode from the other modules 28, 30, 32 or from vehicle systems 34 of the vehicle 24. Alternatively, the mode decider module 26 may be configured to detect a mode change based on a mechanical or digital indication from the operator of the vehicle 24.

The information interfacing module 28 interfaces with the above-listed vehicle systems 34 of vehicle 24. The information sourced from the information interfacing module 28 may be provided via digital display or mechanical gauges directed to the plurality of vehicle systems 34. The frequency of how often the vehicle systems 34 are monitored may be determined by an implementation of the system 20.

The light and gauge control module 30 controls the lighting of the display assembly 22, including any backlighting or indicator lights. The light and gauge control module 30 also manages movement of the mechanical gauges based on the information from the vehicle systems 34 and received by the information interfacing module 28.

The display driving module 32 serves to drive the display assembly 22 with appropriate signals from the mode decider module 26 and the information interfacing module 28. The display driving module 32 may be any sort of control circuitry employed to selectively alter the display of the display assembly 22. The display driving module 32 may be implemented in a way so that a physical image is displayed on the display assembly 22.

Figure 2:
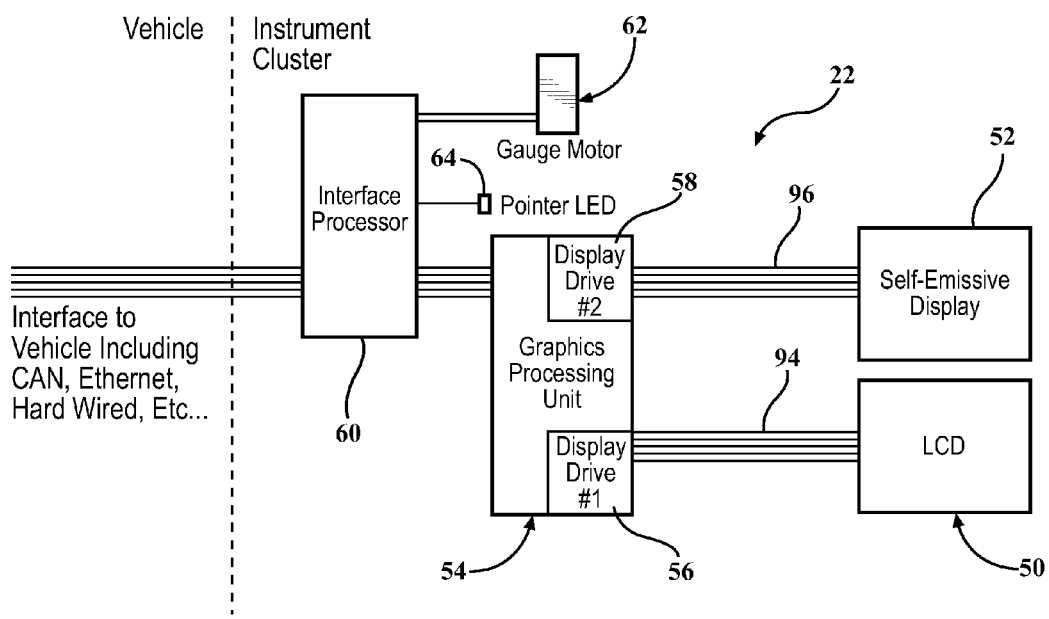
FIG. 2 is a block diagram of the display assembly according to an embodiment.

In FIG. 2, the display assembly 22 of one embodiment is shown. The display assembly 22 includes an LCD 50 that is transparent. The display assembly 22 further includes a self-emissive display 52 that is also transparent and is disposed adjacent to the LCD 50. A graphics processing unit 54 is used to control the LCD 50 and the self-emissive display 52. The graphics processing unit 54 includes a first display driver 56 and a second display driver 58. An interface processor 60 is coupled with the graphics processing unit 54 to operate the display assembly 22. A gauge motor 62 is electrically connected to the interface processor 60. A pointer LED 64 is also electrically connected to and controlled by the interface processor 60.

Each of the above-identified vehicle systems 34 of the vehicle 24 may interface with a device, incorporating certain of the aspects associated with the interface processor 60. More specifically, the mode decider module 26, information interfacing module 28, light and gauge control module 30, and display driving module 32 of the system 20 may be associated with the interface processor 60. The interface processor 60 may be configured to communicate on various bus or networking arrangements used such as, but not limited to Ethernet, CAN, etc. The interface processor 60 may therefore facilitate communication of information that may be displayed on the display assembly 22, or alternatively information that may be shown with objects or features (e.g. mechanical gauges) disposed behind the display. Additionally, the interface processor 60 may store a current mode associated with the system 20 or operation associated with each respective vehicle system 34. Additionally, the communication with each of the vehicle systems 34 may be bi-directional, and may be controlled by an input from the operator of the vehicle 24.

The interface processor 60 is adapted to execute computer program modules 26, 28, 30, 32 for providing functionality described herein. As used herein, the term "module" refers to computer program logic used to provide the specified functionality. Thus, a module can be implemented in hardware, firmware, and/or software. Although, program modules 26, 28, 30, 32 are stored and executed on the interface processor 60 in one embodiment, it should be appreciated that the described functionality may be carried out by alternative techniques or mechanisms.

Figure 3:
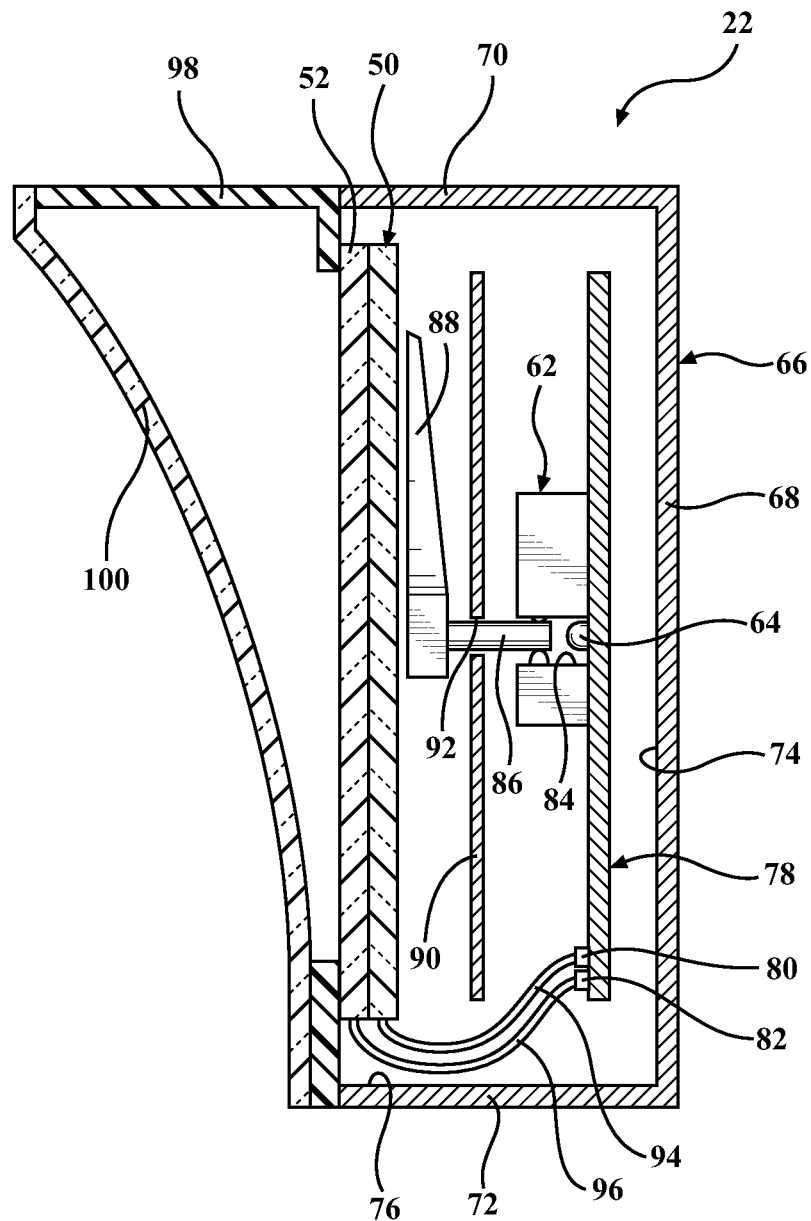
FIG. 3 illustrates a cross-sectional view of an example implementation the display assembly according to an embodiment.

As shown in FIG. 3, the display assembly 22 of one embodiment is an instrument cluster for a vehicle 24 and includes a housing 66 with a backplate 68, and pair of sides that extend transversely from the backplate 68. The housing 66 also includes a top 70 and a bottom 72 each extending transversely from the backplate 68 and attached to and extending between the sides. The backplate 68 and the sides and the top 70 and the bottom 72 of the housing 66 define a cavity 74 and an opening 76. It should be understood that other embodiments of the display assembly 22 may include other housing 66 configurations or may not include a housing 66 at all.

A printed circuit board 78 is disposed in the cavity 74. The printed circuit board 78 is attached to and extends substantially parallel to the backplate 68 between the top 70 and the bottom 72 and between the sides. The printed circuit board 78 includes a main wiring connector (not shown) for power and communication with other electronic devices, such as the vehicle systems 34. The printed circuit board 78 also includes a first graphics connector 80 and a second graphics connector 82. However, it should be appreciated that other embodiments may include other structures and arrangements used to electrically interconnect parts of the display assembly 22.

The interface processor 60 (not shown in FIG. 3) is attached to the printed circuit board 78 and is electrically connected to the main wiring connector to operate the display assembly 22 and to communicate with the vehicle systems 34. For example, the revolutions-per-minute system 20 could be an engine controller which could communicate the current engine revolutions-per-minute (RPM) to the system 20 which then manages the display assembly 22 through the display driver module to display speed of the vehicle 24 on the display assembly 22. Likewise, the speed gauge system 38 could be an anti-lock braking controller which could communicate vehicle speed obtained from wheel speed sensors to the system 20 which then manages the display assembly 22 using the display driver module to display the speed of the vehicle 24 on the display assembly 22. Although an embodiment of the display assembly 22 includes an interface processor 60, it should be understood that the display assembly 22 may function without an interface processor 60 or by utilizing a processor coupled to the display assembly 22, but disposed remotely.

The gauge motor 62 is attached to the printed circuit board 78 and is electrically connected to the interface processor 60. The gauge motor 62 defines an aperture 84 disposed centrally. The gauge motor 62 includes a shaft 86 disposed in the aperture 84 and extending out of the aperture 84. The shaft 86 of the gauge motor 62 extends away from the printed circuit board 78 and the gauge motor 62 and rotates about an axis as the gauge motor 62 is driven. A pointer 88 is attached to and extends radially from the shaft 86 of the gauge motor 62 to rotate about the axis as the shaft 86 is rotated. The pointer LED 64 is attached to the printed circuit board 78 and extends from the printed circuit board 78 into the aperture 84 of the gauge motor 62.

An applique 90 is disposed in a spaced relationship to the printed circuit board 78 and extends substantially parallel to the printed circuit board 78 between the top 70 and the bottom 72 and between the sides and defines at least one orifice 92. The shaft 86 of the gauge motor 62 extends through the orifice 92. In an embodiment, the applique 90 may include printing or graphics to label various features or objects used in the display assembly 22. For example, an applique 90 may be used in a vehicle 24 instrument cluster to label markings to indicate what speed is indicated by the pointer 88.

The LCD 50 of the display assembly 22 is transparent as described above. The LCD 50 of one embodiment of the display assembly 22 is of the monochrome thin film transistor type, however it should be understood that other types of LCDs may be used. The LCD 50 is disposed in a spaced relationship to the applique 90 and extends substantially parallel to the applique 90 between the top 70 and the bottom 72 and between the sides of the housing 66.

As mentioned, the display assembly 22 further includes a self-emissive display 52 that is transparent. The self-emissive display 52 is disposed adjacent to and extends along and in front of the LCD 50 between the top 70 and the bottom 72 and between the sides of the housing 66. Self-emissive displays 52 are suitable to this type of application since they generate their own light and there is no need to light the area behind the self-emissive display 52 with light. The self-emissive display 52 may be of the type such as, but not limited to electroluminescent, Organic Light-Emitting Diode (OLED), or Active Matrix Organic Light-Emitting Diode (AMOLED) types.

The display driving module 32 may interface with a device, incorporating certain of the aspects associated with the graphics processing unit 54. The graphics processing unit 54 is attached to the printed circuit board 78 and is electrically connected to the interface processor 60. The first display driver 56 of the graphics processing unit 54 is electrically connected to the first graphics connector 80 and the second display driver 58 of the graphics processing unit 54 is electrically connected to the second graphics connector 82.

The electrical connection between the printed circuit board 78 and LCD 50 is accomplished with a first display cable 94 extending between and electrically interconnecting the first graphics connector 80 of the printed circuit board 78 and the LCD 50. Likewise, a second display cable 96 extends between and is electrically connected to the second graphics connector 82 of the printed circuit board 78 and the self-emissive display 52.

A mask 98 is also attached to the sides and top 70 and bottom 72 of the housing 66. The mask 98 includes a flange extending transversely and abutting the self-emissive display 52. A lens 100 is attached to the mask 98 and extending over the opening 76 to protect the self-emissive display 52 and the LCD 50 and printed circuit board 78. As with the housing 66, printed circuit board 78, and interface processor 60, it should be appreciated that other embodiments of the display assembly 22 may not include masks 98 or lenses 100.

Figure 4:
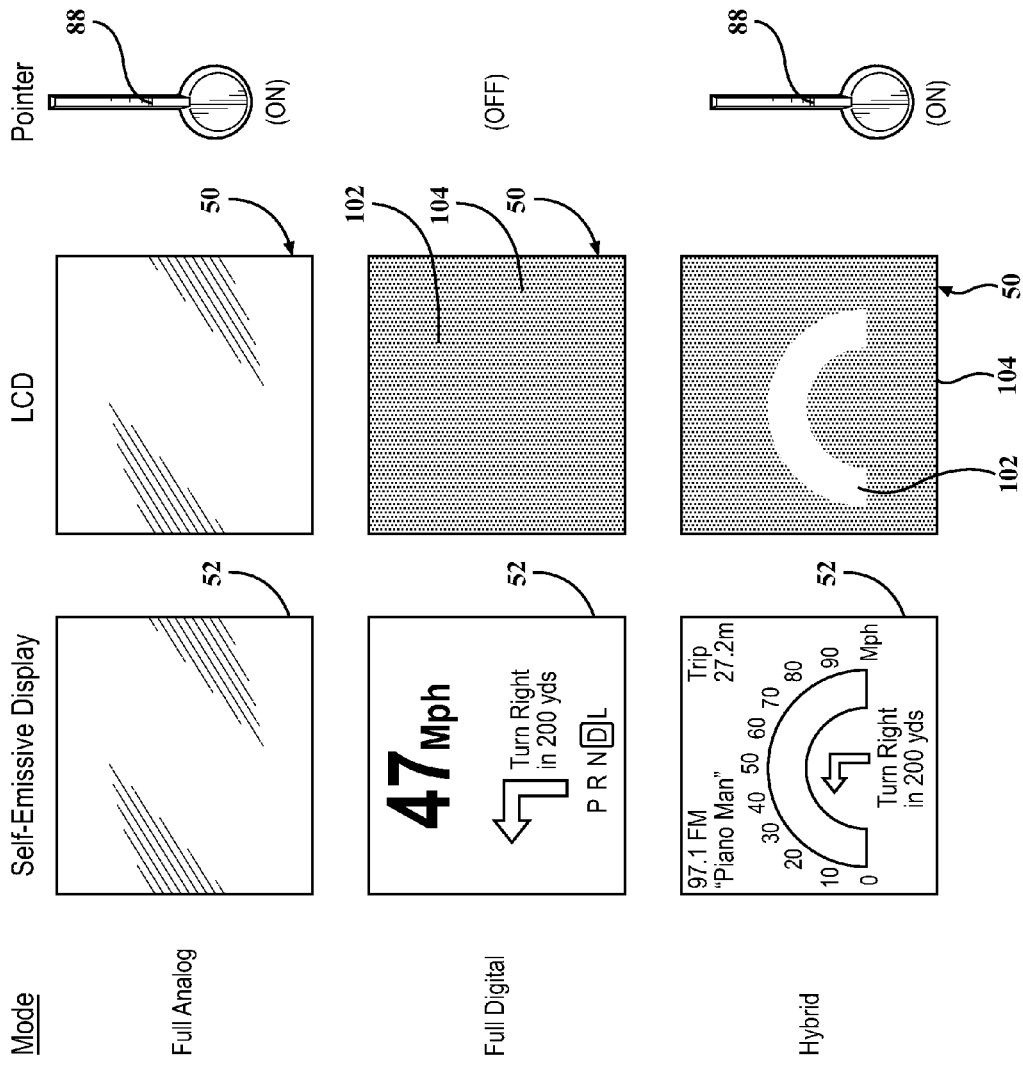
FIG. 4 illustrates an example implementation of the display assembly according to the aspects disclosed herein.

As shown in FIG. 4, the LCD 50 has a viewing area 102 and a blocked area 104. The viewing area 102 and the blocked area 104 are reconfigurable. In other words, the viewing area 102 and the blocked area 104 may comprise any proportion or amount of the entire area of the LCD 50 at any given time. The display driving module 32 of the system 20 may manage the graphics processing unit 54 to control the LCD 50. As described above, the graphics processing unit 54 is coupled with the LCD 50 to control the LCD 50 to selectively allow light to pass through the viewing area 102 while selectively blocking light from passing through the blocked area 104 as the display assembly 22 operates. Similarly, the graphics processing unit 54 is also coupled with the self-emissive display 52 to control the self-emissive display 52 to selectively display an image or video as the display assembly 22 operates.

More specifically, the graphics processing unit 54 is electrically connected to the LCD 50 control the LCD 50 to allow light to pass through the viewing area 102 and the blocked area 104 in the full analog mode. The graphics processing unit 54 is also electrically connected to the self-emissive display 52 to control the self-emissive display 52 to be off as the display assembly 22 operates in the full analog mode. Whether the display assembly 22 operates in the full analog mode, the full digital mode, or the hybrid mode is determined by the mode decider module 26 of the system 20. Because the graphics processing unit 54 is electrically connected to the LCD 50 and self-emissive display 52, it controls the LCD 50 to block light through the viewing area 102 and the blocked area 104 while controlling the self-emissive display 52 to display an image or video as the display assembly 22 operates in the full digital mode. Additionally, the graphics processing unit 54 controls the LCD 50 to allow light to pass through the viewing area 102 and block light through the blocked area 104 while controlling the self-emissive display 52 to display an image or video as the display assembly 22 operates in the hybrid mode. It should be appreciated that the LCD 50 and self-emissive display 52 may be controlled using another device configured to drive the displays or using a graphics processing unit 54 using different arrangement of display drivers 56, 58. Alternatively, the graphics processing unit 54 may be in communication with the display driving module 32, while being disposed in a separate device.

The pointer LED 64 is controlled by the interface processor 60 to be on as the display assembly 22 operates in the full analog mode and in the hybrid mode and to be off as the display assembly 22 operates in the full digital mode. The brightness of the pointer LED 64 may be affected by the signals from lighting system 36 of the vehicle 24 as received by the information interfacing module 28 (e.g. if the driver of the vehicle 24 adjusts the brightness of the cabin lights). Thus, the light and gauge control module 30 may control the pointer LED 64 in response to these signals.

In operation, the mode of the display assembly 22 is determined by the mode decider module 26. The display driver module then manages the LCD 50 and self-emissive display 52 through the display drivers 56, 58 of the graphics processing unit 54 according to the current mode. Various information from the plurality of vehicle systems 34 associated with vehicle 24 is received using the information interfacing module 28. The information about the status of the vehicle 24 may be updated in real-time. The display driver module manage the LCD 50 and self-emissive display 52 to display this information accordingly. The light and gauge control module 30 also manages the pointer LED 64 and gauge motor 62 to move the pointer 88 to correspond with the information received.

Figure 5:
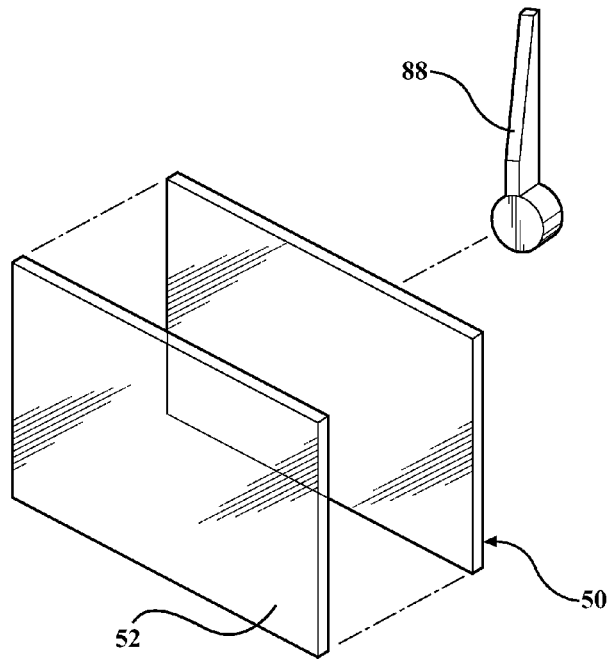
FIG. 5 is an exploded view of an example arrangement of a self-emissive display, an LCD, and a pointer in the display assembly according to an embodiment.

In most instances, transparent self-emissive displays 52 do not block light coming from behind them. As shown in FIG. 5, the self-emissive display 52 of the display assembly 22 is disposed adjacent to and extends along and in front of the LCD 50, so that the LCD 50 is disposed between the self-emissive display 52 and the gauge motor 62 and pointer 88. This means that the LCD 50 may act as a dynamic shutter allowing the gauge motor 62 and pointer 88 to be seen where desired, but may be blocked or concealed as well. The LCD 50 can provide an unlit black background for the self-emissive display 52 in just the blocked area 104 of the LCD 50, or in both the blocked area 104 and in the viewable area. Therefore, as an example, the speedometer pointer 88 or portion thereof of an instrument cluster may be visible during the full analog mode or hybrid mode, but then, may be completely concealed or blocked to display navigation information on the self-emissive display 52. Other examples of use include gaming machines (e.g. slot machine) that may for example have a rotary reel disposed behind the self-emissive display 52 and the LCD 50.

The display assembly 22 may also be easily reconfigured as desired using the system 20. As one example, a manufacturer could make one instrument cluster to be used in multiple countries. The self-emissive display 52 could easily change the unit markings around a mechanical gauge from miles per hour (mph) to kilometers per hour (kph) if the instrument cluster is configured to be used in countries that use that unit of measure. The display driving module 32 of the system 20 could change for example what is displayed in response to messages received through the information interfacing module 28. Likewise, a single display assembly 22 could be reconfigured using the system 20 to be used as an instrument cluster for example in either a sports car or a utilitarian car. The sports car may utilize a tachometer being centrally viewable in the instrument cluster, whereas the utilitarian car may just include a centrally viewable speedometer and no tachometer. In each case, the LCD 50 and the self-emissive display 52 could be controlled by the system 20 through the display driving module 32 as desired.

Several advantages of one or more aspects of the display assembly 22 that is disclosed are that it provides a visually pleasing technique of conveying information while at the same time displaying objects or features behind a display. The disclosed display assembly does not flood the background behind the display with white light in order to block objects or features behind the display. The display assembly 22 also dynamically allows variable portions of the area behind the display to be viewed while others are blocked rather than simply blocking an entire portion of the area behind the display by backlighting the area or alternatively remaining transparent over the entire display. Therefore, the display may be easily customized for a desired application.

The interface processor 60 for example may include a processor (CPU) and a system bus that couples various system components including a system memory such as read only memory (ROM) and random access memory (RAM), to the processor. Other system memory may be available for use as well. The interface processor 60 may include more than one processor or a group or cluster of computing systems networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information, such as during start-up. The interface processor 60 further includes data stores. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores provide nonvolatile storage of computer readable instructions, data structures, program modules 26, 28, 30, 32 and other data for the computing system.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules 26, 28, 30, 32 of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules 26, 28, 30, 32, sub-programs, or portions of code). A computer program can be deployed to be executed on one computer or on multiple computers that are located at one site or distributed across multiple sites and interconnected by a communication network.

The system 20 disclosed herein can also include clients and servers. A client and server are usually remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Obviously, many modifications and variations are possible in light of the above teachings and may be practiced otherwise than as specifically described while within the scope of the appended claims. These antecedent recitations should be interpreted to cover any combination in which the inventive novelty exercises its utility. In addition, the reference numerals in the claims are merely for convenience and are not to be read in any way as limiting.

I claim:
1. A display assembly comprising:
an LCD being transparent;
a self-emissive display being transparent and disposed adjacent to the LCD;
a graphics processing unit to control the LCD and the self-emissive display;
the LCD having a viewing area and a blocked area both being reconfigurable;

the self-emissive display extending along and in front of the LCD;

the graphics processing unit coupled with the LCD to control the LCD to selectively allow light to pass through the viewing area while selectively blocking light from passing through the blocked area as the display assembly operates; and the graphics processing unit coupled with the self-emissive display to control the self-emissive display to selectively display an image and video as the display assembly operates, and the graphics processing unit is electrically connected to the LCD control the LCD to allow light to pass through the viewing area and the blocked area and electrically connected to control the self-emissive display to be off as the display assembly operates in a full analog mode;

the graphics processing unit electrically connected to the LCD to control the LCD to block light through the viewing area and the blocked area and electrically connected to the self-emissive display to control the self-emissive display to display an image and video as the display assembly operates in a full digital mode; and the graphics processing unit electrically connected to the LCD to control the LCD to allow light to pass through the viewing area and block light through the blocked area and electrically connected to the self-emissive display to display an image and video as the display assembly operates in a hybrid mode, in the hybrid mode, the self-emissive display and the LCD are configured to create an arcuate shaped opening for the viewing area, wherein a pointer situated on an opposing side of both the LCD and the self-emissive display is oriented so that only a middle portion of the pointer is visible through the viewing area, and the pointer has a top portion, the middle portion, and a bottom portion, the bottom portion connected to a pivot of the pointer and the middle portion, the top portion connected to the middle portion.

2. A display assembly as set forth in claim 1, further including a printed circuit board having a main wiring connector to power the display assembly and to communicate with other electronic modules.

3. A display assembly as set forth in claim 2 further including an interface processor attached to the printed circuit board and electrically connected to the graphics processing unit and connected to the main wiring connector to communicate to other electronic modules.

4. A display assembly as set forth in claim 3 further including a gauge motor electrically connected to and controlled by the interface processor and the pointer attached to and movable by the gauge motor and the gauge motor and the pointer both disposed behind the LCD and the self-emissive display to conceal the pointer as the graphics processing unit controls the LCD to block light through the viewing area and the blocked area in the full digital mode.

5. A display assembly as set forth in claim 4 wherein the gauge motor defines an aperture disposed centrally and the gauge motor further including a shaft disposed in the aperture and extending out of the aperture to rotate about an axis as the gauge motor is driven and the pointer is attached to and extending radially from the shaft of the gauge motor to rotate about the axis as the shaft is rotated.

6. A display assembly as set forth in claim 5 further including an applique disposed in a spaced relationship to the printed circuit board and extending substantially parallel to the printed circuit board and defining at least one orifice and the shaft of the gauge motor extending through the orifice and the LCD is disposed in a spaced relationship to the applique and extends substantially parallel to the applique.

7. A display assembly as set forth in claim 6 further including a pointer LED extending into the aperture of the gauge motor to illuminate the pointer.

8. A display assembly as set forth in claim 7 wherein the pointer LED is electrically connected to and controlled by the interface processor to be on as the display assembly operates in the full analog mode and in the hybrid mode and to be off as the display assembly operates in the full digital mode.

9. A display assembly as set forth in claim 2 wherein the printed circuit board includes a first graphics connector and a second graphics connector.

10. A display assembly as set forth in claim 9 wherein the graphics processing unit is attached to the printed circuit board and includes a first display driver electrically connected to the first graphics connector and a second display driver electrically connected to the second graphics connector.

11. A display assembly as set forth in claim 10 further including a first display cable extending between and electrically interconnecting the first graphics connector of the printed circuit board and the LCD and a second display cable extending between and electrically interconnecting the second graphics connector of the printed circuit board and the self-emissive display.

12. A display assembly as set forth in claim 2 further including a housing having a backplate and pair of sides each extending transversely from the backplate and a top and a bottom extending transversely from the backplate and attached to and extending between the sides and defining a cavity and an opening.

13. A display assembly as set forth in claim 12 wherein the self-emissive display extends between the top and the bottom and between the sides.

14. A display assembly as set forth in claim 13 further including a mask attached to the sides and top and bottom of the housing and including a flange extending transversely and abutting the self-emissive display.

15. A display assembly as set forth in claim 14 further including a lens attached to the mask to protect the self-emissive display and the LCD and the printed circuit board.

16. A display assembly as set forth in claim 1 wherein the LCD is of the monochrome thin film transistor type.

17. A display assembly as set forth in claim 1 wherein the self-emissive display is of the OLED type.

18. A display assembly as set forth in claim 1 wherein the self-emissive display is of the AMOLED type.

* * * * *